J. P. Gaume.

Slotting Cog Wheels.

N° 5,614.   Patented Jun. 6, 1848.

UNITED STATES PATENT OFFICE.

J. P. GAUME, OF CINCINNATI, OHIO.

MACHINERY FOR CUTTING COG-WHEELS, &c.

Specification of Letters Patent No. 5,614, dated June 6, 1848.

*To all whom it may concern:*

Be it known that I, JOSEPH P. GAUME, of Cincinnati, in the county of Hamilton and State of Ohio, have invented new and useful Improvements in Cutting Engines or Machines for Dividing and Cutting Teeth of Cog-Wheels, and that the following is a full, clear, and exact description of the principle or character which distinguishes them from all other things before known and of the manner of making, constructing, and using the same, reference being had to the accompanying drawings, making part of this specification, in which—

Figure 1:
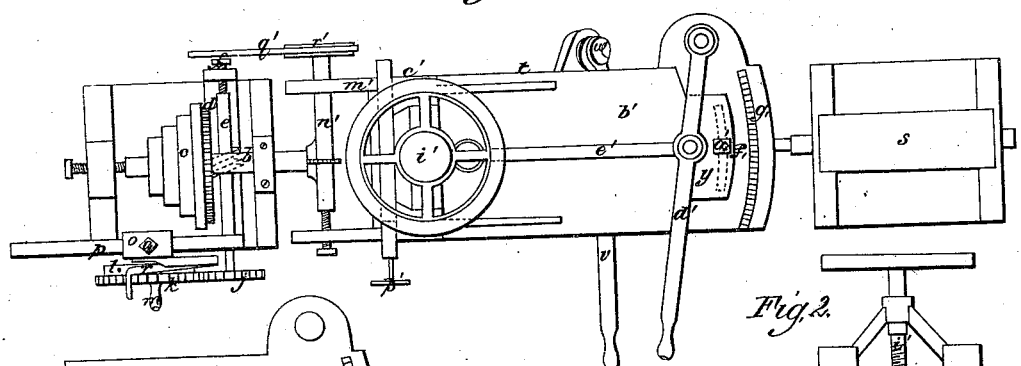
Figure 2:
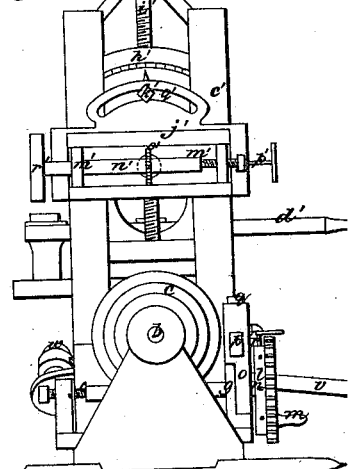
Figure 3:
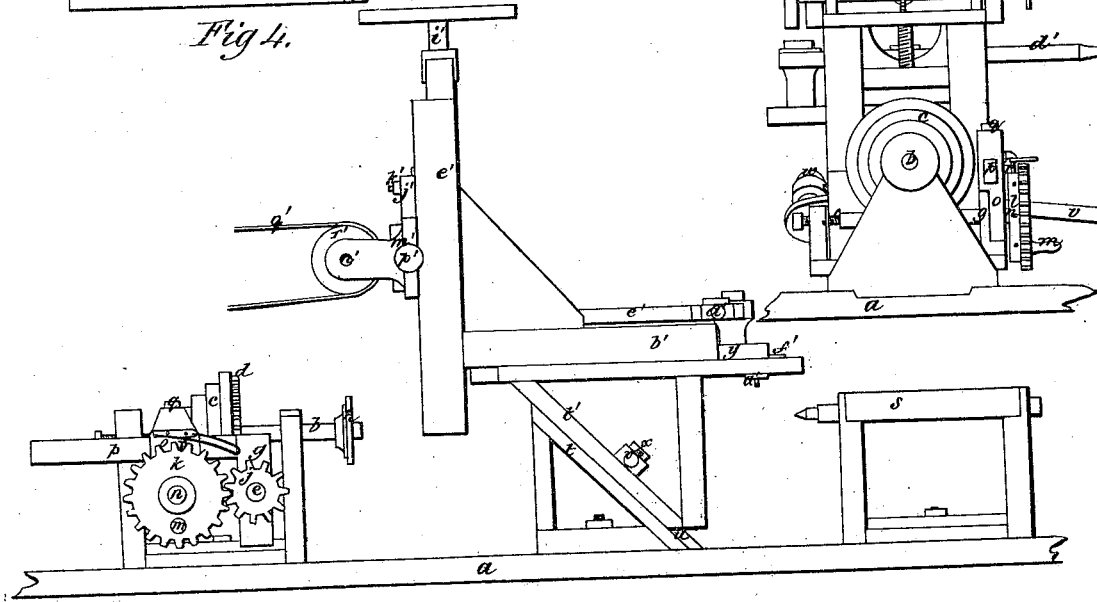

Figure 1 is a plan Fig. 2 a front, and Fig. 3 a side elevation.

The same letters indicate like parts in all the figures.

The leading object of my invention is to adapt the common lathe, by the addition of certain parts, to the cutting of cog wheels, chiefly for the use of small shops and manufactories where a lathe and cutting engine are only required occasionally. And the nature of the first part of my invention consists in adding to a lathe, and in combination with the mandrel thereof, a puppet made in two parts for carrying the cutter the lower half to be attached in the usual manner to the bench and connected with the upper one by an inclined plane that the upper part may slide on the lower one at an angle of forty five or any other number of degrees, for the purpose of carrying the cutter or bur over the wheel in the operation of cutting the cogs of beveled wheels.

The second part of my invention consists in combining with this puppet the cutter frame which carries the spindle of the cutter or bur, by means of an adjustable horizontal slide on which the cutter frame moves back and forth to carry the cutter over the wheel in which the cogs are to be cut, the said slide being a plate with dove tail or other formed edges embraced by or embracing the cutter frame and attached at one end by a fixed bolt to the top plate of the puppet, and at the other by a screw bolt that passes through a curved slot, whereby the cutter frame may be made to carry the cutter, in its horizontal motion diagonally with the axis of the mandrel for the cutting of diagonal cogs, the spindle of the cutter or bur having its bearings in an adjustable slide that moves at right angles to the mandrel to bring the cutter over the axis of the mandrel, (the bed of this slide being connected with a vertical slide in the cutter frame to adapt the cutter to wheels of different diameters), by means of a fixed bolt on one side and a screw bolt passing through a curved slot on the other that the axis of the cutter may be placed at any angle with a vertical line. And the third part of my invention relates to the method of dividing the cogs, and consists in placing the index wheel on a slide that it may be adjusted to a wheel of any desired number of cogs on an arbor that communicates by a screw, or its equivalent, to the mandrel which carries the wheel to be cut, so that by merely changing the wheel on this arbor a single division index may be used for the cutting of any desired number of cogs. And the fourth part of my invention consists in combining the dividing apparatus with the mandrel of a lathe by means of cogs on the pulley of the mandrel or on the mandrel, the dividing apparatus being so arranged that it can be thrown in and out of gear.

In the accompanying drawings (*a*) represents the bench of the lath, and (*b*) the mandrel with its set of cone pulleys (*c*) the face of the larger one of which is a crown cog wheel (*d*) the cogs of which engage with the threads of an endless screw on an arbor (*e*) (the threads of the screw are shown by dotted lines in the plan Fig. 1). One end of this arbor runs on the point of a pivot screw (*f*) and the other has a long journal that runs in a box in a standard (*g*) attached to the bench or the puppet head of the mandrel, so that when the rear end is liberated from the pivot screw the arbor can be moved far enough in the standard (*g*) to carry the threads of the screw out of the cogs of the crown wheel that the mandrel may be used for turning the wheel (*h*); in this way the wheel can be made with great accuracy for it is turned and cut on the same mandrel, and therefore there is no danger of not having it properly centered. When the wheel is to be cut the arbor (*e*) is properly mounted and its outer end is adapted by a collar and nut to receive a spur wheel (*j*) of any desired number of cogs which take into the cogs of the wheel (*k*) one face of which is provided with the division plate or index (*l*) and the other with a handle (*m*) for turning it. This wheel is fitted to, and turns on a stud pin (*n*) projecting from a plate (*o*) that slides on an arm (*p*) of the standard (*g*) that it may be set to the proper pitch line of a wheel of any desired size on the arbor (*e*) and there held by a temper screw (*q*). A spring point or catch (*r*) is used to catch in the notches of the index or division plate (*l*).

From the foregoing it will be seen that with any given size of wheel on the arbor (*e*) the number of cogs to be cut may be varied by the motions of the dividing or index wheel, as in the ordinary dividing engine, and that by changing, the wheel on the arbor (*e*) any variation can be given to these divisions.

Figure 4:
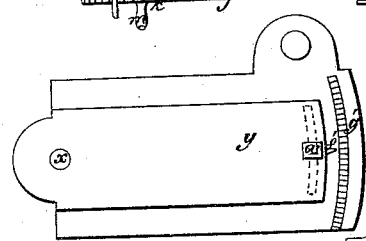

The wheel having been turned and the dividing apparatus put in connection—the centering puppet head (*s*) of the lathe is thrown back and the extra puppet (*t*) is secured in place on the bench. This puppet is made in two parts (*t*, *t'*) connected together by a dovetail or other slide (*u*) at an angle of 45 or any other number of degrees with the plane of the bench. The lower half (*t*) is secured to the bench and the other (*t'*) can be made to slide on it by means of a handle or lever (*v*) that turns on a fulcrum pin (*w*) attached to the lower half and connected with the upper half by a pin (*x*) that passes through a slotted hole in a well known manner. The top plate of the upper half is on a plane parallel with the mandrel and has a dovetail slide (*y*) connected with it at the forward end by a fixed bolt (*z*) (see Fig. 4 which is a plan view of this part) and, at the other end by a screw bolt (*a'*) that passes through a curved slot (see dotted lines) in the top plate, so that any horizontal inclination desired may be given to this slide, which is embraced by the bottom plate (*b'*) of the cutter frame (*c'*) which can be made to slide thereon by a handle or lever (*d'*) that turns on a fulcrum pin attached to the puppet and connected with the cutter frame by a joint link (*t'*), so that by the motion of this lever the attendant carries the cutter back and forth horizontally over the edge of the wheel to be cut for cutting spur cogs in a direction parallel with the axis of the mandrel, or inclined therewith as the slide may be set, to be indicated by a pointer (*f'*) on the cutter frame, and an index (*g'*) on the top plate of the puppet. But when the machine is to be used for cutting the cogs on bevel wheels then the cutter frame is carried by sliding the upper part (*t'*) of the puppet head on the lower part (*t*) the inclination of this slide determining the bevel of the cogs cut.

The forward part of the cutter frame has a plate (*h'*) that slides in it vertically by means of a screw (*i'*) to adapt the cutter to any desired diameter of wheel to be cut; to this is connected another plate (*j'*) that turns on a bolt (shown by dotted lines in the front elevation) and further secured by a screw bolt (*k'*) that passes through a curved slot (*l'*) by means of which the plate (*j'*) may be turned on the fixed bolt as a center to give any desired inclination to the axis of the cutter; and this last named plate is provided with dovetail ways in which slides the cutter carrier (*m'*), which is a frame in which are the bearings of the spindle (*n'*) of the cutter (*o'*) so that this may be regulated endwise by a set screw (*p'*). The cutter is rotated by a belt (*q'*) that passes from any first mover over a pulley (*r'*) on the spindle.

From the foregoing it will be seen that the cutter can be adjusted in any direction relatively to the axis of the mandrel that carries the wheel to be cut, and that by means of one of the handles or levers the cutter frame can be moved back and forth to cut the cogs by sliding the cutter carriage on the puppet in a horizontal plane parallel with the axis of the mandrel, which by the adjustment of the ways or slide on the puppet may be adjusted to move in a vertical plane projected from the axis of the mandrel or at an inclination therewith to cut oblique cogs; or by means of the other handle that the cutter frame may be made to move with the upper part of the puppet on an inclined plane to cut the cogs of bevel cog wheels. It will be obvious from the above that the plane of the junction of the two halves of the puppet may be made at any inclination desired to suit the bevel of the wheel intended to be cut.

What I claim as my invention and desire to secure by Letters Patent is—

1. Making the puppet which carries the cutter frame in two parts separated by an inclined plane that one may slide on the other for cutting the cogs of bevel wheels in combination with the cutter frame that slides thereon, substantially as described.

2. And I also claim the cutter frame and double puppet combined together as herein described in combination with the mandrel of the lathe substantially as described.

3. I also claim the method of adapting the index or division plate that has but one set of divisions to any division of cogs desired to be cut by means of shifting the wheel on the arbor that communicates motion to the mandrel in combination with the sliding connection of the index or division wheel, substantially as described, whereby numerous divisions on the index plate is avoided.

4. And finally I claim the dividing apparatus in combination with the mandrel of a lathe by means of the cog wheel and pulleys put on one and the same mandrel, substantially as described, whereby the wheels to be cut can be turned and cut on the same mandrel without being removed therefrom to insure good work as described, and whereby also the turning lathe may be used for a cutting engine, as described.

J. P. GAUME.

Witnesses:
   L. SAWYER,
   E. SINGER.